United States Patent [19]
Cody

[11] Patent Number: 5,451,928
[45] Date of Patent: Sep. 19, 1995

[54] APPARATUS FOR PREVENTION OF KEY LOCKED IN CAR

[75] Inventor: Sheila Cody, 3454 W. Barry, Chicago, Ill.

[73] Assignee: Shiela Cody, Chicago, Ill.

[21] Appl. No.: 109,345

[22] Filed: Aug. 20, 1993

[51] Int. Cl.⁶ .............................................. B60Q 1/00
[52] U.S. Cl. ..................... 340/457; 340/568; 340/572
[58] Field of Search ............... 340/457, 425.5, 438, 340/459, 568, 571, 572, 551, 539

[56] References Cited

U.S. PATENT DOCUMENTS

| | | | |
|---|---|---|---|
| 2,847,656 | 8/1958 | Ricks | 340/457 |
| 3,609,741 | 9/1971 | Miller. | |
| 3,790,945 | 2/1974 | Fearon. | |
| 4,087,802 | 5/1978 | Williamson. | |
| 4,196,424 | 4/1980 | Williamson | 340/572 |
| 4,223,296 | 9/1980 | Kim et al. | 340/457 |
| 4,811,000 | 3/1989 | Humphrey et al. | 340/572 |
| 4,962,369 | 10/1990 | Close | 340/572 |
| 5,079,540 | 1/1992 | Narlow et al. | 340/572 |
| 5,079,541 | 1/1992 | Moody | 340/572 |

FOREIGN PATENT DOCUMENTS 8403975 10/1984 WIPO ................................. 340/572

Primary Examiner—Brent Swarthout
Attorney, Agent, or Firm—Hill, Steadman & Simpson

[57] ABSTRACT

A method and apparatus for preventing a person from leaving an enclosed space having a door while leaving an article behind, such as preventing a driver from leaving an automobile while leaving the ignition keys within the automobile. Sensing elements are mounted on opposite sides of the door and a sensing device is located with the person. A shield which is adapted to cover the sensed element is attached to the ignition key. When the driver leaves the car without the ignition key, and without the shield covering the sensed element, the sensing device sounds an audible or visual alarm.

11 Claims, 1 Drawing Sheet

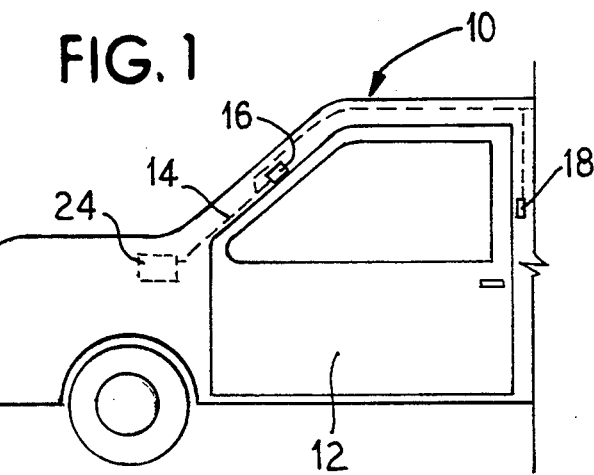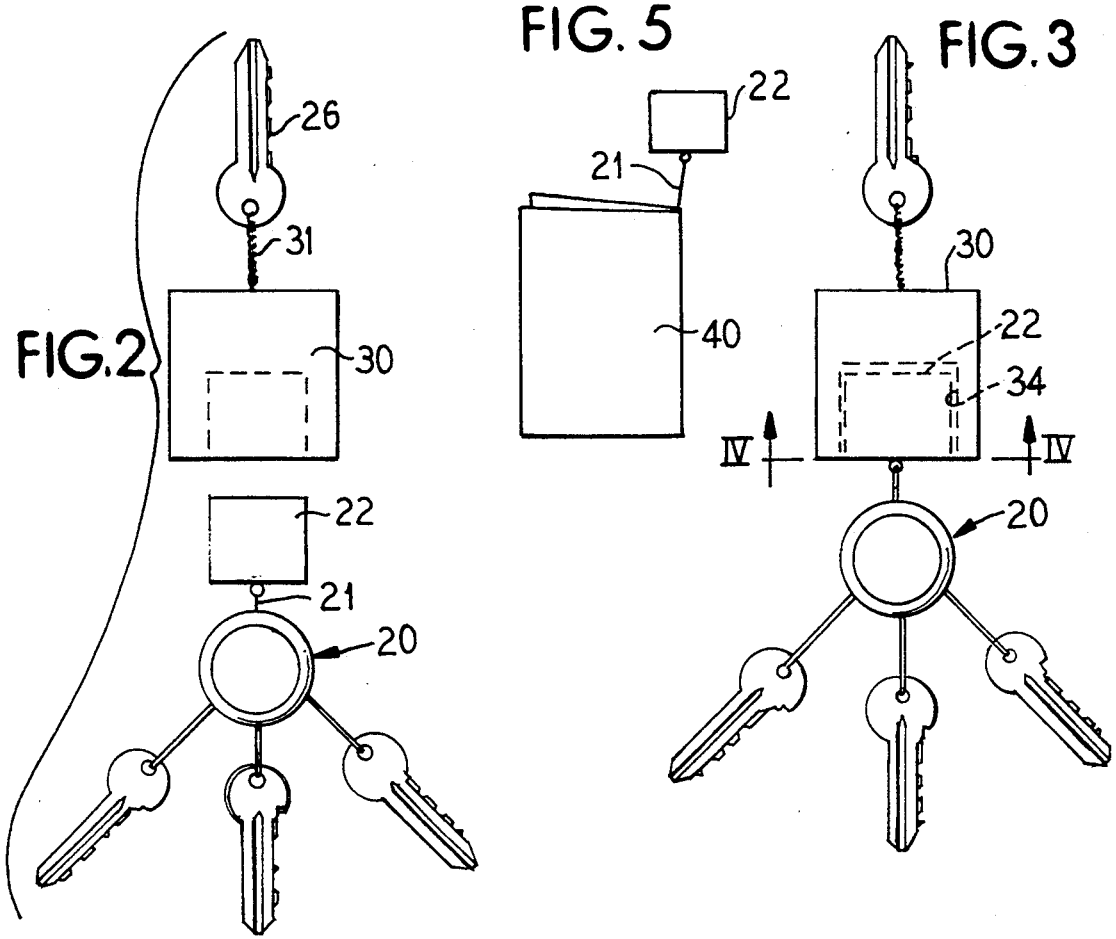

APPARATUS FOR PREVENTION OF KEY LOCKED IN CAR

BACKGROUND OF THE INVENTION

It is a common problem among car owners worldwide that ignition keys are inadvertently left inside automobiles after the operator has left the automobile, resulting in an ignition key being locked in the car. Since the ignition key is often also the key which operates the automobile door, the automobile must be opened by an alternate key or by special equipment.

The same problem can exist with regard to using keys to unlock homes, offices, etc., where the key for gaining access to the particular compartment can be inadvertently locked inside the compartment.

SUMMARY OF THE INVENTION

It is an object of the present invention to provide a method and apparatus which effectively prevents the inadvertent locking of keys inside an occupiable compartment, such as a car. The device can effectively be applied to other compartments such as houses or offices.

The device operates similarly to the known theft detection devices such as used in department stores to prevent merchandise from being removed from the store. These devices are disclosed, for example, in U.S. Pat. Nos. 4,196,424; 4,962,369; 5,079,540 as well as 4,087,802, all of which are herein incorporated by reference. In these known devices, a tag having a signal producing element coacts with surveillance monitors to produce a warning signal. The surveillance monitors are located on either side of a passway toward an exit door of the store. The interaction between the tag and the sensing device can be accomplished using a variety of technologies. For example, the tag may be of the magnetic, microwave or radio frequency type. The sensing device will then be of a type responsive to the particular type of technology (i.e., magnetic, microwave or radio frequency) dictated by the tag. Typically, an electromagnetic signal emanating from the sensing device is received by an electronic circuit or antenna in the tag which radiates or resonates a feedback signal which is received by the sensing devices. Although tags which are powered such as by a wristwatch battery can be used, the unpowered-type tag is preferable because of the ability to make the tag of a small size.

The device of the present invention is composed of two parts, preferably connected together by snapping engagement. One of the parts is worn at all times by the operator, such as being attached to the belt, purse, wallet, breast pocket, or generally any part of the attire. This part corresponds to the tag element as described in the aforementioned patents pertaining to store security devices. The respective other part comprises a shield which covers or surrounds the first mentioned part when engaged thereto. The second part is secured to the ignition key and can be separated with the ignition key from the first part for use in the automobile or other compartment.

Two sensors are arranged on opposite sides of the doorway to the automobile or compartment and arranged in position such that egress from the vehicle will require passage of the first part therebetween. As with the alarms of the afore-mentioned patents, passage of this first part past the sensors will trigger an audible or visual alarm. In proper operation, the operator would remove the ignition key and snap the second part over the first part providing a shield of the first part with respect to the sensors and thus the operator with the ignition key can pass through the door without triggering the sensors. Thus, the method and apparatus of the present invention triggers a warning to prevent inadvertent separation of the operator and the ignition key when egressing an automobile or compartment.

BRIEF DESCRIPTION OF THE DRAWINGS

FIG. 1 is a partial elevational view of an automobile with the present invention installed;

FIG. 2 is an exploded elevational view of a particular feature of the present invention;

FIG. 3 is an elevational view of the apparatus of FIG. 2 in an assembled condition; and FIG. 4 is a sectional view taken generally along line IV—IV of FIG. 3.

FIG. 5 is a perspective view of an alternate embodiment of the apparatus of FIG. 2.

DETAILED DESCRIPTION OF THE PREFERRED EMBODIMENTS

FIG. 1 shows an automobile 10 having a driver's side door 12 surrounded by a door frame 14 as is known. A first sensor 16 and a second sensor 18 are mounted on opposite sides of the door 12 to the door frame 14. The sensors 16, 18 can be of a magnetic, radio frequency, microwave, or other sensing type as is known. U.S. Pat. Nos. 4,196,424; 4,962,369; 5,079,540 and 4,087,802 disclose such devices and are herein incorporated by reference.

FIG. 2 shows a key chain 20 having a flexible strap element 21 connecting a sensed element 22 thereto. The sensed element is of a known type such as disclosed in the above-mentioned patents such as a magnetic element, an electronic circuit element, and an antenna element, or other element which when passed between the first sensor 16 and the second sensor 18 triggers an audible or visual alarm from an annunciator 24 shown in FIG. 1. FIG. 2 shows an ignition key 26 attached to a sheath 30 by a chain or strap 31 and which is composed of a shielding material to prevent sensing of the sensed element 22 by the first and second sensors 16, 18. The material may be a ferromagnetic material or a lead material such as is known for the shielding application desired.

FIG. 3 shows the sensed element 22 installed grippingly within the sheath 30 which results in a shielding of the sense element 22. Thus, when an operator attempts to leave the automobile as shown in FIG. 1 with the key chain 20, but without the installed sheath 30 of the ignition key 26, the sensed element 22 will activate the alarm caused by passing between the first and second sensors 16, 18.

FIG. 4 shows the sensed element 22 grippingly engaged within the sheath 30. The sheath 30 comprises a slot 34 which is sized to tightly grip the sensed element 22 therein. Other attachment means for holding the sensed element 22 within the sheath 30 are readily foreseeable such as tabs, spring clips, locking devices, etc.

FIG. 5 shows an alternate embodiment wherein the sense element 22 is attached by the flexible strap element 21 to a wallet or billfold 40. Thus, when the operator attempts to egress the vehicle, the ignition keys must be removed from the ignition and engaged with the operator's wallet before egress to avoid tripping of the alarm by the sensor 16, 18.

It is to be noted that the alarm by the annunciator 24 can be a momentary alarm such that it is no more than a reminder to the egressing operator to make sure that keys have been retained before closing the automobile door and inadvertently locking the door.

Although the present invention has been described with reference to a specific embodiment, those of skill in the art will recognize that changes may be made thereto without departing from the scope and spirit of the invention as set forth in the appended claims.

I claim as my invention:

1. An apparatus for generating an alarm corresponding to a person egressing a compartment through a doorway while leaving an article behind, comprising:
   a sensing means mounted adjacent the doorway;
   a sensed element carried by the person through the doorway;
   a shielding element adapted to coact with the sensed element for preventing the sensed element from being sensed by said sensing means, said shielding element having means applied thereon for connecting said article to said shielding element; and
   wherein said article comprises an ignition key for a car, and said compartment comprises an automobile.

2. The apparatus according to claim 1, wherein said sensing means comprises a first sensor and a second sensor mounted on opposite sides of the doorway.

3. The apparatus according to claim 1, wherein said sensed element comprises a first body and said shielding element comprises a second body having a concavity therein sized to receive said first body to shield said first body from said sensing means.

4. The apparatus according to claim 3, wherein said concavity comprises a slot and said first body comprises a tabular shape tightly interfittable within said slot.

5. The apparatus according to claim 1, wherein said sensing means comprises a radio frequency responsive device, and said sensed element comprises an electronic device which alters said radio frequency.

6. The apparatus according to claim 1, wherein said sensing means comprises a magnetic sensing device and said sensed element is magnetic.

7. The apparatus according to claim 1, wherein said sensed element is mounted onto a key chain.

8. A method for preventing unintentional egress from a vehicle while leaving the ignition key within the vehicle, comprising the steps of:
   providing a sensing device adjacent a vehicle door;
   providing a first part which can be sensed by said sensing device to be retained by a driver of the vehicle; and
   providing a second part connected to said ignition key, said second part fashioned to shield said first part from said sensing device;
   causing said sensing device to activate an alarm when said first part egresses with the driver past the sensing device without being shielded by said second part.

9. An apparatus for preventing unintentional egress from a vehicle while leaving the ignition key within the vehicle, comprising:
   a sensing device mounted adjacent a door of the vehicle;
   an alarm device operatively connected to said sensing device to be activated by said sensing device for generating a user recognizable alarm;
   a first part which is sensed by said sensing device upon departing the vehicle when not shielded by a second part to activate said alarm device to generate a user recognizable alarm, and retained by an operator of the vehicle;
   a second part connected to an ignition key of the vehicle, said second part fashioned to shield said first part from said sensing device.

10. The apparatus according to claim 9, wherein said first part comprises a first body, and said second part comprises a second body having a concavity therein sized to receive said first body to shield said first body from said sensing device; and
   said second part further comprises a flexible member connecting said second body to said ignition key.

11. The apparatus according to claim 10, further comprising a key chain and wherein said first part is carried on said key chain.

* * * * *